(12) United States Patent
Sun et al.

(10) Patent No.: US 10,591,225 B2
(45) Date of Patent: Mar. 17, 2020

(54) PHASE CHANGE HEAT STORAGE DEVICE

(71) Applicant: PIONEER ENERGY (JIANGSU) CO., LTD, Suzhou, Jiangsu (CN)

(72) Inventors: Li Sun, Jiangsu (CN); Hong Wang, Jiangsu (CN); Xiaolong Liu, Jiangsu (CN); Changjun Wang, Jiangsu (CN)

(73) Assignee: PIONEER ENERGY (JIANGSU) CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/870,305

(22) Filed: Jan. 12, 2018

(65) Prior Publication Data
US 2018/0135919 A1 May 17, 2018

Related U.S. Application Data

(63) Continuation of application No. PCT/CN2016/072751, filed on Jan. 29, 2016.

(30) Foreign Application Priority Data

Jul. 31, 2015 (CN) .......................... 2015 1 04654057

(51) Int. Cl.
*F28D 20/02* (2006.01)
*F28F 13/12* (2006.01)
*F28D 20/00* (2006.01)

(52) U.S. Cl.
CPC ......... *F28D 20/021* (2013.01); *F28D 20/028* (2013.01); *F28F 13/125* (2013.01);
(Continued)

(58) Field of Classification Search
CPC ................ F28D 20/021; F28D 20/028; F28D 2020/0078; F28D 2020/0026; F28F 13/125
(Continued)

(56) References Cited

U.S. PATENT DOCUMENTS 4,609,036 A * 9/1986 Schrader ............... F28D 20/021
126/618
5,649,431 A * 7/1997 Schroeder, Jr. ....... F24F 5/0017
62/434
(Continued)

FOREIGN PATENT DOCUMENTS

CN 1719185 A 1/2006
CN 103090712 A 5/2013
(Continued)

OTHER PUBLICATIONS

International Search Report (English and Chinese) and Written Opinion issued in International Application PCT/CN2016/072751 dated May 6, 2016, 10 pages.

*Primary Examiner* — Tho V Duong
(74) *Attorney, Agent, or Firm* — Hamre, Schumann, Mueller & Larson, P.C.

(57) ABSTRACT

The utility model discloses a novel phase change heat storage device, comprising a housing, wherein the housing is internally provided with a lining; an insulating layer is disposed between the lining and the housing; the lining is internally filled in with a phase change material; a coiled pipe is embedded in the phase change material; the inlet and outlet of the coiled pipe both extend out of the lining and are respectively welded with and communicate with a main water inflow pipe and a main water outflow pipe, so all welds between the coiled pipe and the main water inflow pipe and main water outflow pipe are positioned outside the lining and are not soaked by the phase change material. The lining is provided with at least one partition board; the partition board divides the inner space of the lining into independent spaces such that the phase change material is respectively positioned in the independent spaces divided by the partition board. Compared with the prior art, the utility model has a simple and novel structure design, solves the (Continued)

defects of existing phase change heat storage devices, greatly improves the heat exchange effect of the phase change heat storage device, reduces the production cost of the device, and prolongs the service life of the device.

6 Claims, 2 Drawing Sheets

(52) U.S. Cl.
    CPC .. *F28D 2020/0086* (2013.01); *F28F 2270/00* (2013.01); *Y02E 60/145* (2013.01)

(58) Field of Classification Search
    USPC .............................................. 165/10, 104.17
    See application file for complete search history.

(56) References Cited

U.S. PATENT DOCUMENTS

| | | | | |
|---|---|---|---|---|
| 7,059,759 B2* | 6/2006 | Hummer | ............... | B01F 5/0218 366/137 |
| 8,554,377 B2* | 10/2013 | Mathur | ............... | F28D 20/0039 700/282 |
| 2006/0048929 A1* | 3/2006 | Aaron | ....................... | F28D 7/08 165/173 |
| 2008/0276616 A1* | 11/2008 | Flynn | ....................... | F01K 3/12 60/641.15 |
| 2011/0226780 A1* | 9/2011 | Bell | ..................... | F28D 20/0034 220/565 |
| 2012/0227926 A1* | 9/2012 | Field | ..................... | F24D 11/003 165/10 |
| 2013/0025817 A1* | 1/2013 | Callaghan | ............ | F28D 20/0056 165/10 |

FOREIGN PATENT DOCUMENTS

| | | |
|---|---|---|
| CN | 103185367 A | 7/2013 |
| CN | 105021076 A | 11/2015 |
| CN | 204902647 U | 12/2015 |
| WO | 2015072503 A1 | 5/2015 |

* cited by examiner

PHASE CHANGE HEAT STORAGE DEVICE

BACKGROUND OF THE INVENTION

Technical Field

The utility model relates to the field of heat storage, in particular to a novel phase change heat storage device.

Description of the Related Art

Existing phase change heat storage devices are still immature in structural design of lining and coiled pipe components, so the internal heat exchange components in the heat storage devices exchange heat non-uniformly, and the utilization of phase change materials are insufficient, so the existing phase change heat storage devices have a low heat exchange efficiency, indirectly increasing the production cost of the devices. The existing phase change heat storage devices have the defect that welds between the pipes in the heat exchange component and the main flow path are soaked in the phase change materials, thus the welds become corroded by the phase change materials and generate fatal damage, and the welded parts soaked in the phase change materials are inconveniently maintained after being damaged, causing a relatively short service life to the existing phase change heat storage devices. Finally, the choices of users are affected.

BRIEF SUMMARY OF THE INVENTION

The objective of the utility model is to provide a novel phase change heat storage device which has a high heat exchange efficiency and a long service life to overcome defects in the prior art.

The objective of the utility model can be fulfilled by the following technical solution:

A novel phase change heat storage device includes a housing, wherein the housing is internally provided with a lining; an insulating layer is disposed between the lining and the housing; the lining is internally filled in with a phase change material; a coiled pipe is embedded in the phase change material; the inlet and outlet of the coiled pipe both extend out of the lining and are respectively welded with and communicate with a main water inflow pipe and a main water outflow pipe, so all welds between the coiled pipe and the main water inflow pipe and main water outflow pipe are positioned outside the lining and are not soaked by the phase change material.

The lining is provided with at least one partition board; the partition board divides the inner space of the lining into independent spaces such that the phase change material is respectively positioned in the independent spaces divided by the partition board, thus improving the heat exchange efficiency of the phase change heat storage device and prolonging the service life of the phase change material.

The partition board is formed with a through-hole wherein the coiled pipe runs through, and the partition board is held at the middle portion of the coiled pipe.

The device is also provided with a pneumatic stirring mechanism which pneumatically stirs the phase change material.

The lining is formed with a vent hole, which communicates with the external air, at the top end, ensuring that the whole device works under normal pressure.

A temperature detecting blind pipe for measuring the temperature of the phase change material is embedded in the phase change material, and disposed on a line which connects the central hole of the device and a corner edge.

The coiled pipe is a copper pipe.

The insulating layer is any one or any combination of several ones of a foamed polyurethane layer, an aerogel insulating layer, an inorganic nano insulating layer and a VIP vacuum insulating board.

The housing shape can be cylindrical, square or plate-like.

A base is disposed below the housing.

The novel phase change heat storage device can achieve the following functions in actual applications.

Heat charging: industrial waste heat or boiler heat is used to heat water; then the hot water flows through the coiled pipe to heat the phase change materials; after the phase change materials absorb the heat, the temperature gradually rises to the phase-change temperature point; phase change material changes in phase and continuously absorbs heat; after the phase is completely changed, the material can continuously absorb the heat and rise in temperature. Thus, the heat storage process is completed.

Heat release: when hot water is needed, a valve switch is controlled to drive cold water to flow through the coiled pipe, and the cold water absorbs heat from the heat exchange material to become hot water which can be used by people, achieving the instant heating function. As the cold water continuously absorbs heat, the temperature of the phase change material drops, and the phase change material changes phase at the phase-change temperature point and releases latent heat. During and after the phase change, the temperature of the phase change material drops continuously and the phase change material releases heat, completing the heat release process.

Compared with the prior art, the novel phase change heat storage device of the utility model optimizes the design structure of the coiled pipe component for heat exchange, avoiding the defect that the welds in the existing phase change heat storage device are soaked in the phase change material. The utility model makes the post-maintenance of the phase change heat storage device more convenient and feasible and prolongs the service life of the phase change heat storage device. Moreover, the lining is internally provided with the partition board which divides the phase change material into multiple sections, improving the heat exchange effect of the phase change heat storage device and reducing the production cost of the phase change heat storage device. The utility model employs additional reinforcing structures and protective measures, ensuring the stability and use safety of the phase change heat storage device during working.

The utility model has a simple and novel structure design, solves the defects of existing phase change heat storage devices, greatly improves the heat exchange effect of the phase change heat storage device, reduces the production cost of the device, and prolongs the service life of the device.

In the figures, 1—housing; 2—insulating layer; 3—lining; 4—phase change material; 5—coiled pipe; 6—temperature detecting blind pipe; 7—partition board; 8—base; 9—vent hole; 10—main water inflow pipe; 11—main water outflow pipe.

DETAILED DESCRIPTION OF THE INVENTION

The utility model is described in detail with reference to the attached drawings and embodiment.

Embodiment

Figure 1:
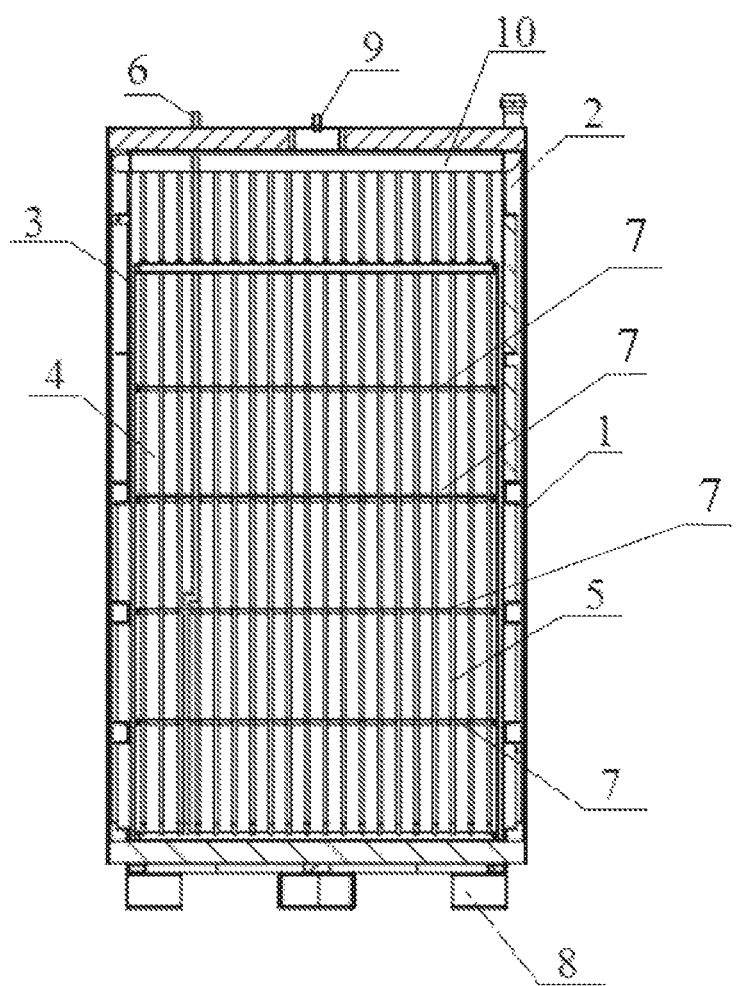
FIG. 1 is a structural view of a phase change heat storage device of the utility model.
Figure 2:
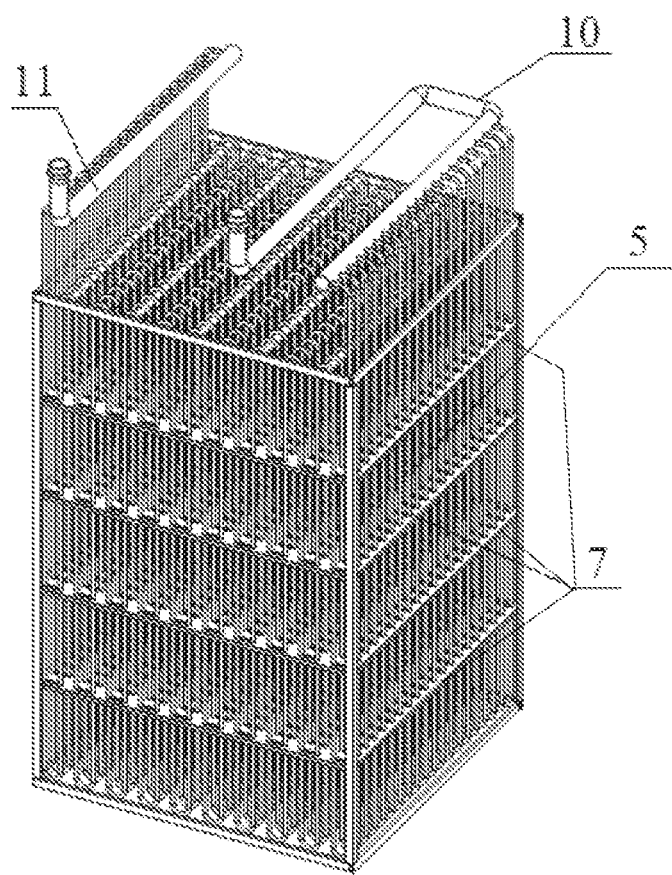
FIG. 2 is a structural view of a coiled pipe in the lining.

A novel phase change heat storage device, as shown in FIG. 1 and FIG. 2, includes a housing 1, wherein the housing 1 is internally provided with a lining 3; an insulating layer 2 is disposed between the lining 3 and the housing 1; the lining 3 is internally filled in with a phase change material 4; a coiled pipe 5 is embedded in the phase change material 4; the inlet and outlet of the coiled pipe 5 both extend out of the lining 3 and are respectively welded with and communicate with a main water inflow pipe 10 and a main water outflow pipe 11, so all welds between the coiled pipe 5 and the main water inflow pipe 10 and main water outflow pipe 11 are positioned outside the lining 3 and are not soaked by the phase change material 4. The main water inflow pipe 10 and the main water outflow pipe 11 have openings facing a vertical direction. The inlet of the coiled pipe 5 is welded on a portion of the main water inflow pipe 10 that extends horizontally, and the outlet of the coiled pipe 5 is welded on a portion of the main water outflow pine 11 that extends horizontally. In the utility model, the lining is provided with at least one partition board 7; the partition board 7 divides the inner space of the lining 3 into independent spaces such that the phase change material 4 is respectively positioned in the independent spaces divided by the partition board 7, thus improving the heat exchange efficiency of the phase change heat storage device and prolonging the service life of the phase change material. The partition board 7 is formed with a through-hole which the coiled pipe 5 runs through, and the partition board 7 is held at the middle portion of the coiled pipe 5. The coiled pipe 5 is a copper pipe. The lining 3 is formed with a vent hole 9, which communicates with the external air, at the top end, ensuring that the whole device works under normal pressure. The housing shape can be cylindrical, square or plate-like. A base 8 is disposed below the housing 1.

The insulating layer 2 is any one or any combination of several ones of a foamed polyurethane layer, an aerogel insulating layer, an inorganic nano insulating layer and a VIP vacuum insulating board. Upon demands, the device is also provided with a pneumatic stirring mechanism which pneumatically stirs the phase change material 4. A temperature detecting blind pipe 6 for measuring the temperature of the phase change material is embedded in the phase change material 4, and disposed on a line which connects the central hole of the device and a corner edge.

The novel phase change heat storage device of the utility model can achieve the following functions in actual applications.

Heat charging: industrial waste heat or boiler heat is used to heat water; then the hot water flows through the coiled pipe to heat the phase change materials; after the phase change materials absorb the heat, the temperature gradually rises to the phase-change temperature point; phase change material changes in phase and continuously absorbs heat; after the phase is completely changed, the material can continuously absorb the heat and rise in temperature. Thus, the heat storage process is completed.

Heat release: when hot water is needed, a valve switch is controlled to drive cold water to flow through the coiled pipe, and the cold water absorbs heat from the heat exchange material to become hot water which can be used by people, achieving the instant heating function. As the cold water continuously absorbs heat, the temperature of the phase change material drops, and the phase change material changes phase at the phase-change temperature point and releases latent heat. During and after the phase change, the temperature of the phase change material drops continuously and the phase change material releases heat, completing the heat release process.

With the description of the above embodiments, those ordinarily skilled in the art can understand and use the utility model. Those skilled in the art can easily make various amendments to the embodiments and apply the general principle described here to other embodiments without inventive labor. Therefore, the utility model is not limited to the above embodiments. All improvements and amendments made by those skilled in the art according to the enlightenment of the utility model should fall within the protective scope of the utility model.

What is claimed is:

1. A novel phase change heat storage device, comprising:
   a housing internally provided with a lining;
   an insulating layer disposed between the lining and the housing, the lining being internally filled in with a phase change material; and
   a coiled pipe embedded in the phase change material;
   wherein an inlet and an outlet of the coiled pipe both extend out of the lining and are respectively welded with and communicate with a main water inflow pipe and a main water outflow pipe,
   wherein the lining is internally provided with at least one partition board; the at least one partition board divides the inner space of the lining into independent spaces such that the phase change material is respectively positioned in the independent spaces divided by the at least one partition board,
   wherein the at least one partition board is formed with a through-hole which the coiled pipe runs through, and the at least one partition board is held at a middle portion of the coiled pipe,
   wherein the coiled pipe extends vertically across the inner space of the lining from a bottom of the lining to a top of the lining,
   wherein the inlet and the outlet of the coiled pipe, the main water inflow pipe, and the main water outflow pipe are disposed at a top of the novel phase change heat storage device, the main water inflow pipe and the main water outflow pipe have openings facing a vertical direction, and
   wherein the inlet of the coiled pipe is welded on a portion of the main water inflow pipe that extends horizontally, and the outlet of the coiled pipe is welded on a portion of the main water outflow pipe that extends horizontally.

2. The novel phase change heat storage device according to claim 1, wherein the lining is formed with a vent hole, which communicates with the external air, at the top end.

3. The novel phase change heat storage device according to claim 1, wherein a temperature detecting blind pipe for measuring the temperature of the phase change material is embedded in the phase change material.

4. The novel phase change heat storage device according to claim 1, wherein the coiled pipe is a copper pipe.

5. The novel phase change heat storage device according to claim 1, wherein the insulating layer is any one or any combination of several ones of a foamed polyurethane layer, an aerogel insulating layer, an inorganic nano insulating layer and a VIP vacuum insulating board.

6. The novel phase change heat storage device according to claim 1, wherein a base is disposed below the housing.

* * * * *